(12) United States Patent
Gabrys (10) Patent No.: US 7,954,418 B2
(45) Date of Patent: Jun. 7, 2011

(54) COMPOSITE CONTAINMENT OF HIGH ENERGY DEBRIS AND PRESSURE

(75) Inventor: Jonathan W. Gabrys, Downingtown, PA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 12/426,773

(22) Filed: Apr. 20, 2009

(65) Prior Publication Data

US 2010/0095832 A1    Apr. 22, 2010

Related U.S. Application Data (60) Division of application No. 11/263,747, filed on Nov. 1, 2005, now Pat. No. 7,597,040, which is a continuation-in-part of application No. 10/630,500, filed on Jul. 30, 2003, now Pat. No. 7,008,173.

(51) Int. Cl.
*F41H 5/02* (2006.01)

(52) U.S. Cl. .............. 89/36.02; 89/36.01; 89/36.04; 89/36.05; 89/36.08

(58) Field of Classification Search .............. 89/36.02, 89/36.05, 36.08
See application file for complete search history.

(56) References Cited

U.S. PATENT DOCUMENTS

| | | | |
|---|---|---|---|
| 678,064 A * | 7/1901 | Theis | 109/82 |
| 1,508,421 A * | 9/1924 | Taegen | 109/83 |
| 1,698,514 A | 1/1929 | Schmidt | |
| 2,999,667 A | 9/1961 | Morley | |
| 3,261,228 A | 7/1966 | Rothman | |
| 3,261,288 A | 7/1966 | Dickerson | |
| 3,534,807 A | 10/1970 | Bracken, Jr. | |
| 3,602,602 A | 8/1971 | Motta | |
| 4,186,648 A * | 2/1980 | Clausen et al. | 89/36.02 |
| 4,377,370 A | 3/1983 | Porcelli | |
| 4,623,574 A * | 11/1986 | Harpell et al. | 428/113 |
| 4,836,084 A | 6/1989 | Vogelesang et al. | |

(Continued)

FOREIGN PATENT DOCUMENTS

EP    0 922 837 A2    6/1999

(Continued)

OTHER PUBLICATIONS

*Smurfit-MBI*, available at http://www.smurfit-mbi.com/services/specialty_p.html, (Oct. 6, 2005), 2 pages.

(Continued)

*Primary Examiner* — Troy Chambers
*Assistant Examiner* — Samir Abdosh
(74) *Attorney, Agent, or Firm* — Alston & Bird LLP (57) ABSTRACT

A protective device for use in containing high energy debris and pressure is provided which employs a plurality of energy absorption elements disposed on an outer surface of an inner sheet, where the outer surface faces away from the body being protected and toward the high energy event, such as an explosion. Each energy absorption element extends generally away from the body to permit the high energy event to first impact upon the energy absorption elements, rather than the body. Energy absorbing elements are configured with a base and a cap and are formed of laminate composite materials. As such, energy absorption elements are configured to contain or reduce high energy debris material and pressure impacting the energy absorption element through delamination and possibly penetration of the composite material.

27 Claims, 5 Drawing Sheets

U.S. PATENT DOCUMENTS

| | | | |
|---|---|---|---|
| 5,087,516 A | 2/1992 | Groves | |
| 5,163,809 A | 11/1992 | Akgun et al. | |
| 5,272,954 A * | 12/1993 | Crouch | 89/36.02 |
| 5,333,532 A | 8/1994 | Smirlock et al. | |
| 5,336,044 A | 8/1994 | Forrester | |
| 5,349,893 A | 9/1994 | Dunn | |
| 5,364,679 A | 11/1994 | Groves | |
| 5,387,451 A | 2/1995 | Miller | |
| 5,435,226 A * | 7/1995 | McQuilkin | 89/36.02 |
| 5,437,538 A | 8/1995 | Mitchell | |
| 5,471,905 A | 12/1995 | Martin | |
| 5,534,343 A | 7/1996 | Landi et al. | |
| 5,551,318 A | 9/1996 | Fukushima | |
| 5,686,689 A | 11/1997 | Snedeker et al. | |
| 5,784,926 A | 7/1998 | Maass | |
| 6,003,424 A * | 12/1999 | Cordova et al. | 89/36.02 |
| 6,182,531 B1 * | 2/2001 | Gallagher et al. | 74/572.11 |
| 6,233,737 B1 * | 5/2001 | Ditchfield et al. | 2/2.5 |
| 6,418,832 B1 * | 7/2002 | Colvin | 89/36.02 |
| 6,485,446 B1 | 11/2002 | Brother et al. | |
| 6,895,851 B1 | 5/2005 | Adams et al. | |
| 6,945,155 B2 | 9/2005 | Cordova et al. | |
| 7,008,173 B2 * | 3/2006 | Gabrys et al. | 415/9 |
| 2007/0240621 A1 * | 10/2007 | Qiao | 109/26 |
| 2008/0236378 A1 * | 10/2008 | Sane et al. | 89/36.02 |

FOREIGN PATENT DOCUMENTS

| | | |
|---|---|---|
| FR | 0 027 756 A1 | 4/1981 |

OTHER PUBLICATIONS

*Cardboard Boxes* vs. *Corrugated Boxes*, available at http://www.dusobox.com/cardboard.html, (Oct. 6, 2005), 1 page.

*Corrugated Packaging industry*, MANOSPACK, available at http://www.manospack.gr/english/corrugated_basics.htm, (Oct. 6, 2005), 3 pages.

*What is Corrugated?*, The Fibre Box Association, available at http://www.fibrebox.org/Info/WhatIsCorrugated.aspx, (Oct. 6, 2005), 2 pages.

* cited by examiner

COMPOSITE CONTAINMENT OF HIGH ENERGY DEBRIS AND PRESSURE

CROSS-REFERENCE TO RELATED APPLICATIONS

This application is a divisional of and claims priority to U.S. patent application Ser. No. 11/263,747, filed on Nov. 1, 2005 now U.S. Pat. No. 7,597,040, which is a continuation-in-part of U.S. patent application Ser. No. 10/630,500, filed on Jul. 30, 2003, now issued as U.S. Pat. No. 7,008,173, both of which are hereby incorporated herein in their entireties by reference.

FIELD OF THE INVENTION

The present invention relates to a device for absorbing high energy events, and, more particularly, to a device having a composite structure designed to absorb high energy events and to contain high energy debris material and/or pressure.

BACKGROUND OF THE INVENTION

A variety of materials are used in armor, shields, and other protective devices. In particular, composite materials are used in some such protective structures to reduce thickness and weight of the structures and/or to increase the flexibility of the structures. For example, a flexible laminate of composite material is conventionally used for forming body armor, which can be incorporated into a suit for protection from explosive blasts and projectiles.

Armor for vehicles, on the other hand, is typically formed of metal plates that are connected to the body or frame of the vehicle. In the case of armored trucks and other armored vehicles, such metal armor can significantly increase the weight of the vehicle, thereby potentially decreasing vehicle performance and efficiency, reducing the effectiveness of the vehicle's suspension, and increasing the need for maintenance.

As the effectiveness and use of certain weaponry is increased, more personnel and structures are potentially exposed to the damaging effects of the weaponry. For example, the increased use of improvised explosive devices (IEDs) has put greater numbers of personnel, vehicles, equipment, and other resources at risk. In some cases, such IEDs have become sufficiently powerful to overcome conventional personnel body armor and vehicle armor. In addition to the risks associated with IEDs, personnel, vehicular resources, equipment resources, and other types of resources are at risk of armor piercing incendiaries (APIs), such as 12.7 mm APIs, high explosive incendiaries (HEIs), such as 30 mm HEIs, landmines, and other forms of high energy ordnance. Further, merely increasing the thickness or number of layers of conventional armor to sufficiently protect against improved IEDs, APIs, and HEIs would result in prohibitively heavy armor in some cases.

Thus, there exists a need for improved devices and apparatus for absorbing high energy events and containing materials and/or pressure which can be used for protecting personnel, vehicles, equipment, and other resources which require protection from high energy debris material and pressure.

BRIEF SUMMARY OF THE INVENTION

Embodiments of the present invention provides devices and apparatus for absorbing high energy events and containing materials and/or pressure, and, in particular, devices and apparatus which use configurations of lightweight composite materials for absorbing high energy events, including, for example, containing high energy debris material and pressure. By using lightweight composite materials, embodiments of the present invention may be designed for use in low-weight applications such as body armor and armor for weight-critical resources such as aircraft. Configurations of composite material are employed to increase the effectiveness of the material being used, thereby resulting in a lightweight design. In embodiments of the present invention, composite materials are used, not merely as a lightweight alternative to heavier materials, but are designed for containing high energy debris material and pressure, including absorbing high energy events. Embodiments of the present invention take advantage of the characteristic of delamination of composite materials to absorb high energy events.

According to one embodiment of the present invention, a composite armor panel is used to protect a body from a high energy event, such as an explosion or debris material with high kinetic energy directed to impact the body. The composite armor panel includes an inner sheet with an inner surface facing the body and an opposing outer surface. A plurality of energy absorbing elements are disposed on the outer surface. The energy absorbing elements are formed of a laminate composite material. When a high energy event impacts an energy absorbing element, the laminate composite materials may deform inward toward the body, but are designed to at least partially delaminate to at least partially absorb energy of the event and, thereby, to contain high energy debris material or pressure from directly impacting the body.

Energy absorption elements may be formed to define a contoured shape which is susceptible to delamination in the event of external stress from a high energy event, such as the impact of a high kinetic energy debris material or high energy pressure shock wave from an explosion. For example, energy absorption elements may be formed in an S-shaped configuration, or, for example, energy absorption elements may be formed of two portions, a base which extends from the outer surface and a cap which attaches to the distal end of the base and extends generally tangential to the outer surface. Energy absorption elements may be formed integrally with composite materials of an outer surface as a unitary member. Energy absorption elements typically are arranged to overlap at least a portion of an adjacent energy absorption element. An outer sheet may also be used to cover, protect, hide, etc. the energy absorbing elements.

An embodiment of the present invention also provides a body armor system employing armor panels with composite energy absorption elements. Particularly in an embodiment where the present invention provides a body armor system, a plurality of perforations may be included to permit air flow, such as to prevent the body from overheating due to coverage of the body with panels of the body armor system. An embodiment of the present invention further provides a method of protecting a body with energy absorbing elements. These and other characteristics, as well as additional details, of embodiments of the present invention are further described in the Detailed Description with reference to the above mentioned embodiments and other embodiments.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

Embodiments of present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention are applied variations of a containment device for a rotary device. Many rotary devices include a surrounding structure for containing fragments that are released by the device during a failure. For example, a conventional rotary device such as a flywheel has a housing that surrounds the flywheel. The housing can be a strong, rigid structure designed to withstand the impact of pieces, or fragments, of the flywheel that are released if the flywheel breaks while operating at a high rotational speed. Due to the high speed and/or mass of conventional rotary devices, the fragments released during failure can have significant kinetic energy. Therefore, the housing must be strong in order to contain the fragments, typically requiring a thick housing that adds weight and cost to the device.

U.S. Pat. No. 6,182,531, titled "Containment Ring for Flywheel Failure," which issued Feb. 6, 2001, describes a containment vessel that includes an outer ring with a plurality of inner shaped energy absorbing elements that produce an inner ring layer. The inner shaped energy absorbing elements are juxtapositioned axially along the inner periphery of the outer ring and configured to produce hollow cells that plastically deform to absorb the energy from an impact of a high energy material fragment, such as are produced during catastrophic failure of a flywheel. The inner shaped energy absorbing elements are configured to deform at a sufficiently fast rate to prevent the inner shaped energy absorbing elements from rupturing or buckling. Similarly, U.S. patent application Ser. No. 10/630,500, titled "High Energy Containment Device and Turbine with Same," filed Jul. 30, 2003, describes a containment vessel that includes an outer ring with a plurality of energy absorbing elements. In comparison to the inner shaped elements of U.S. Pat. No. 6,182,531, the energy absorption elements of U.S. patent application Ser. No. 10/630,500 include base and cap portions which function in much the same manner as the inner shaped energy absorbing elements of U.S. Pat. No. 6,182,531. While containment devices of U.S. Pat. No. 6,182,531 and U.S. patent application Ser. No. 10/630,500 primarily use plastic deformation of metal and like materials to protect against fragments of materials of a rotary device which separates or disintegrates, thereby converting rotational energy into kinetic energy, embodiments of the present invention primarily use the delamination of composite materials to protect against high energy events, such as debris and pressure impacts upon a body. As used herein, the term body may be, but is not limited to, a body of a person or other living organism, and generally refers to the structure of a resource, including, but not limited to, the body of an aircraft, tank, ship, or weapon, a storage container, an equipment case or housing, or a like resource. Body refers to any object or thing, not merely a human or other form of a like living organism. Also, as used herein, the term absorb, when used in the context of composite materials absorbing the impact of high energy events, does not imply that all of the energy of the impact of the event is fully absorbed by the composite materials, but refers to the ability of the composite material to absorb and/or transition at least a portion of the energy of the impact of the event such that the result is a decreased affect of the impact of the high energy event upon the body protected by the composite materials, such as used in a composite body armor. Further, while embodiments of the present invention may be designed both to protect against high energy events and associated debris material and pressure by absorbing energy and physically containing debris material and pressure, these combined acts are generally referred to herein as the containment of high energy debris material and pressure. And, although in some instances both actions are described individually to emphasize that function of embodiments of the present invention, the individual description of one action, such as the containment of high energy events, typically refers to both actions of energy absorption and physical containment.

Energy absorption elements in accordance with embodiments of the present invention are formed, at least in part, of composite materials, such as graphite-reinforced plastic or carbon fiber reinforced plastic (CFRP or CRP). Composite materials typically are defined as being an engineered materials made from two or more components. One component is often a strong fiber or fibrous material, such as carbon fiber or Kevlar™ from the E.I. du Pont de Nemours and Company of Wilmington, Del., that gives the composite material its tensile strength. Another component, typically referred to as the laminate or matrix, is often a resin or an epoxy with a thermoplastic mix that binds the fiber materials together. The matrix material transfers loads over the fiber materials. The fibers resist tension in the composite material, and the matrix resists shearing in the composite material. Composite materials often are referred to as layered or laminated structures, although a continuous fiber reinforced material is usually intended by reference to layered and laminated structures, in comparison to short fiber reinforced materials. A composite material has the characteristic of separation at the laminate or matrix between fiber materials under such conditions as force impacts and excess loading. The separation of the interface between two layers of a composite material is referred to as delamination. By comparison, metals typically will bend and deform under force impacts or excess load conditions; this characteristic is generally referred to as plastic deformation. Energy absorption elements are formed of a composite material so that the energy absorption elements will delaminate to absorb energy which impinges the energy absorption elements. Preferably, energy absorption elements are configured to delaminate at a rate fast enough to absorb the high level of energy from impinging debris material or pressure over an extended time interval and, thereby, to prevent localized damage to or failure of an inner sheet or portion of the body protected by an armor system of an embodiment of the present invention. Lengthening the duration of the impact of a high energy event (increasing the total impact time interval) reduces the peak force or energy level that must be absorbed by an armor system and the body protected by the armor system since the impact energy is dissipated and absorbed over a longer impact period. Thus, the strength required to prevent damage to or failure of an inner sheet or portion of the body protected by an armor system of an embodiment of the present invention is reduced. Correspondingly, the weight and costs of armor and support structures to protect a body are reduced in turn as well. In the event of a projection impact, penetration of the composite material may also tend to occur. Penetration may cause tension and shear failure of the composite material, such as breakage of reinforcing fibers of the composite material. Penetration failure of a composite material may also reduce the impact of a high energy event, such as to reduce the kinetic energy of a projectile, thereby reducing the potential for complete penetration of the projectile though the composite material and impact upon the body protected by an embodiment of the present invention.

Figure 1:
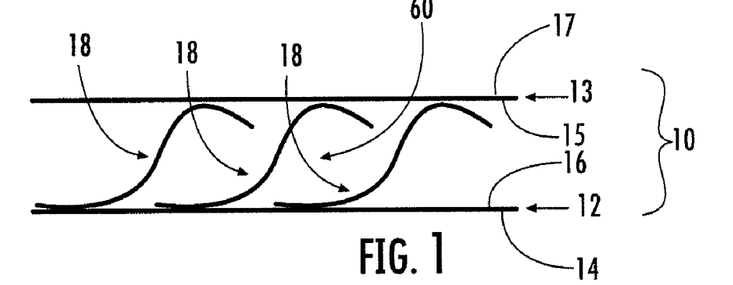
FIG. 1 illustrates the cross-section of a portion of an armor panel according to one embodiment of the present invention.

Referring now to the figures, and in particular to FIG. 1, there is shown a portion of an armor system 10 in accordance with an embodiment of the present invention for containing high energy events, such as retaining structural fragments, foreign objects, and other material, referred to generally as debris material, and suppressing high energy pressure events such as explosive shock waves. An embodiment of an armor system 10 of the present invention, such as a composite armor panel or body armor, includes a rigid inner sheet 12 that defines an inner surface 14 and an opposing outer surface 16. The inner surface 14 of the inner sheet 12 is directed toward the body which is to be protected by the armor system 10. An armor system 10 typically also includes an outer sheet 13 that defines an interior surface 15 directed toward the inner surface 16 of the inner sheet 12 and an opposing exterior surface 17. The term sheet, as used herein, such as an inner sheet or an outer sheet, may be, but is not limited to, a planar structure. The term sheet generally refers to an expanse of material, which typically is planar, but may be contoured or otherwise non-planar to form a particular shape, such as a fender or bumper of a vehicle or a chest plate for personnel body armor.

Figure 2:
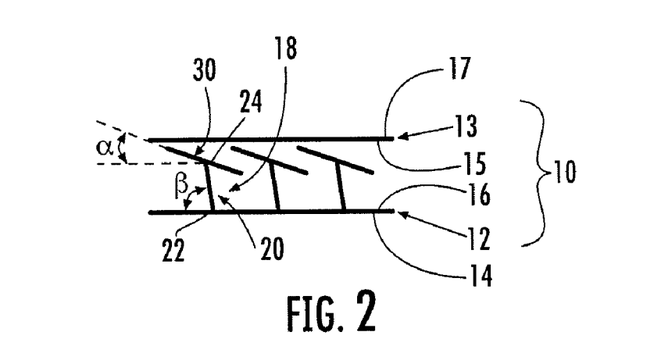
FIG. 2 illustrates the cross-section of a portion of another armor panel according to one embodiment of the present invention.

The inner sheet 12 is designed to be unyielding in the event of a high energy event and is protected from high energy events by a plurality of energy absorption elements 18 juxtaposed along the outer surface 16 of the inner sheet 12 such that the inner sheet 12 does not experience direct contact with debris materials or pressure from a high energy event. The energy absorption elements 18 are at least partially constructed of a laminate composite material, can define a variety of shapes and sizes, and may be referred to as inner shaped elements. For example, an energy absorbing element 18 may be S-shaped, as shown in FIG. 1, or have a base 20 and a cap 30, which can be adhered or otherwise connected, as shown in FIG. 2. Each energy absorption element 18 is disposed on the outer surface 16 of the inner sheet 12 and extends generally away from the inner sheet 12 and, if present, toward the outer sheet 13, such that each energy absorption element 18 extends at least partially perpendicular (with a vector component at least partially perpendicular) to a tangent of the inner sheet 12 where the energy absorption element 18 contacts the inner sheet 12. In one embodiment of the present invention, energy absorption elements and the outer surface of an inner sheet may be formed as a unitary member, such as where the inner sheet is at least partially formed of a composite material which extends to form the energy absorption elements. In the example embodiment of FIG. 1, the energy absorption elements 18 are configured and positioned to produce hollow cells 60 between adjacent energy absorption elements 18 and the outer surface 16 of the inner sheet 12. For example, energy absorption elements 18 may be configured in size, shape, and location such that each energy absorption element 18 overlaps at least part of one of the energy absorption elements 18 proximate thereto. These hollow cells 60 can be of a wide variety of shapes and sizes, and may or may not have a closed circumference. A configuration of energy absorption elements 18 which produces hollow cells 60 allows the energy absorption elements 18 to flex, bend, and delaminate without necessarily impacting an adjacent energy absorption element 18. Further, by separating energy absorption elements 18 such that adjacent energy absorption elements 18 do not touch, in a manner which happens to form hollow cells 60, the energy absorption elements 18 are generally unsupported at one or more ends, thereby promoting the energy absorption elements 18 to be affected by high energy events, resulting in delamination of the composite materials of the energy absorption elements 18. And if adjacent energy absorption elements flex, bend, break, or delaminate in such a manner to press onto an adjacent energy absorption element, the load of the high energy event may be at least partially distributed to the adjacent energy absorption element.

As shown in FIG. 1, energy absorbing elements in accordance with embodiments of the present invention typically may be defined as a contoured shape which is characteristic of having layers of composite material adhered together to form the energy absorbing element. With regard to a contoured energy absorption element made from a composite material, such as the S-shaped energy absorption element 18 shown in FIG. 1, when a force is exerted upon the contoured energy absorption element and the contoured shape tends to be flattened, delamination may occur in the composite materials of the energy absorption element. The result of the delamination is that a compressive force of an impact, such as from high energy debris material or high energy pressure, on a composite material is transferred into shear forces which cause delamination of the composite material. The deformation, or destruction, of the composite material results in an absorption of energy of the impact, such as discussed with regard to FIGS. 17 and 18.

Figure 3:
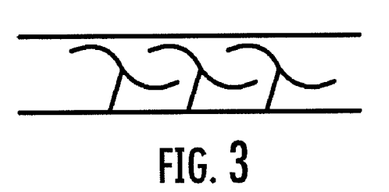
FIG. 3 illustrates the cross-section of a portion of yet another armor panel according to one embodiment of the present invention.
Figure 4:
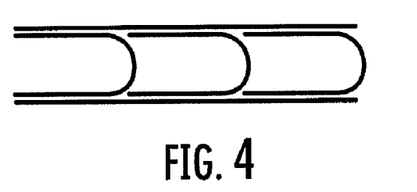
FIG. 4 illustrates the cross-section of a portion of yet another armor panel according to one embodiment of the present invention.
Figure 5:
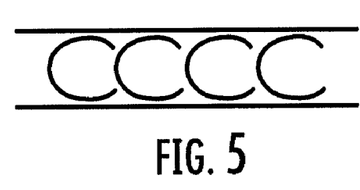
FIG. 5 illustrates the cross-section of a portion of yet another armor panel according to one embodiment of the present invention.
Figure 6:
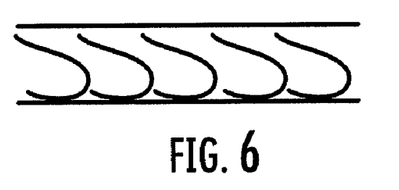
FIG. 6 illustrates the cross-section of a portion of yet another armor panel according to one embodiment of the present invention.

Because composite materials may be formed in any number of shapes, embodiments of the present invention are not limited to S-shaped configurations, but may be other shapes which are susceptible to permitting delamination of the composite material as a result of a high energy event which impacts upon the composite material. For example, ⊃-shaped (FIG. 4), ⊂ or C-shaped (FIG. 5), slanted J-shaped (FIG. 6) configurations, and other curved configurations of composite materials, as well as combination curved and flat configurations, such as a λ-shaped (lambda-shaped) configuration, as shown in FIG. 3, which employs a flat base and an S-shaped cap, may be employed to permit delamination of composite material energy absorbing elements. Combination configurations may be beneficial for base and cap configurations where the cap may tend to break free from the base, thereby permitting the shaped configuration of the cap to continue to absorb energy through delamination of the cap, and possibly through separate delamination of the base.

Figure 7:
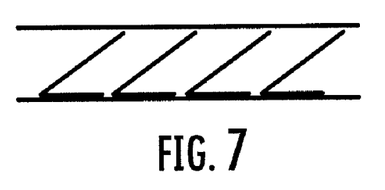
FIG. 7 illustrates the cross-section of a portion of yet another armor panel according to one embodiment of the present invention.
Figure 8:
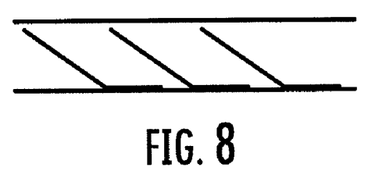
FIG. 8 illustrates the cross-section of a portion of yet another armor panel according to one embodiment of the present invention.

Although a contoured shape may be typical for energy absorption elements, an embodiment of an energy absorption element of the present invention may also be defined by other shapes. For example, energy absorption elements may be defined as an angled plate which extends at an acute or obtuse angle from the outer surface 16 such as a an acute ∠-shaped element (FIG. 7), an obtuse ι-shaped element (FIG. 8), or even a perpendicular L-shaped element. In addition, for example, an energy absorption element may be defined by generally flat composite materials which are adhered or otherwise connected to each other, as shown in FIG. 2, in which each energy absorbing element 18 includes a base 20 and a cap 30. As illustrated, the base 20 and cap 30 are generally flat members, such as plate-like pieces of composite material. A base 20 is disposed on the outer surface 16 of the inner sheet 12 and extends generally away from the inner sheet 12 and, if present, toward the outer sheet 13, such that the base 20 extends at least partially perpendicular (with a vector component at least partially perpendicular) to a tangent of the inner sheet 12 where the base 20 contacts the inner sheet 12. A first end 22 of the base 20 is connected to the outer surface 16 of the inner sheet 12. Each cap 30 is attached to a second end 24 of the respective base 20 so that the cap 30 is cantilevered from the base 20 and defines an angle with the base 20. The bases 20 and caps 30 can be formed of the same or different materials, and each can have a different size and thickness. For example, each base 20 can be configured to delaminate to absorb the energy of impact of debris material and/or pressure, and each cap 30 can be configured to resist shear failure so that the debris material does not pierce the caps 30 and travel through the inner sheet 12.

As shown in FIG. 2, the base 20 of each energy absorption element 18 can be configured at an angle $\beta$, relative to the tangent of the outer surface 16 where the base 20 connects to the outer surface 16. Each cap 30 can be configured at an angle $\alpha$ relative to the same tangent. According to one example embodiment of the present invention in which energy absorption elements 18 are formed of bases 20 and corresponding caps 30, the angle $\beta$ is between about 30 and 150 degrees, and angle $\alpha$ is between about −45 and 45 degrees. In one exemplary embodiment of the present invention a midpoint of the cap 30 can be connected to the base 20 so that the cap 30 extends equidistant in opposing directions from the base 20. Thus, each cap 30 can define first and second ends, each of which are cantilevered from the respective base 20, and the first end of each cap 30 can extend to overlap the second end of the cap 30 of an adjacent energy absorption member 18. Alternatively, each base 20 can be connected to other portions of the respective cap 30 rather than a midpoint so that the cap 30 extends a greater distance on one side of the base 20 or even extends in only one direction from the base 20 to form a sideways L-shape with the base 20. Further, one or both of the cap 30 and base 20 of each energy absorption element 18 can be curved, such as described above as combination curved and flat configurations, such as a λ-shaped (lambda-shaped) configuration which employs a flat base and an S-shaped cap. Further, for example, a curved cap 30 can extend from a generally flat base 20 so that the energy absorption element 18 defines a hooked or upside-down J-shaped member. In any case, the energy absorption elements 18 can collectively extend continuously along the outer surface 16 of the inner sheet 12 to absorb energy from debris materials and/or pressure impacting the energy absorption elements 18 and, possibly, to contain debris material that impacts an armor system in accordance with an embodiment of the present invention.

Preferably, the energy absorption elements 18 are configured to prevent debris material from piercing the inner sheet 12 of an armor system in accordance with an embodiment of the present invention. The energy absorption elements 18 also are preferably configured so that if an energy absorption element 18 is sufficiently deformed by debris material and/or pressure, the energy absorption element 18 contacts at least one other absorption element 18, thereby spreading the load associated with the debris material and/or pressure over multiple energy absorption elements 18. The inner sheet 12 is preferably sufficiently rigid to support the energy absorption elements 18 while the energy absorption elements 18 contain debris material and/or pressure. However, the inner sheet 12 can alternatively be configured to also deform to contain debris material and/or pressure.

Figure 9:
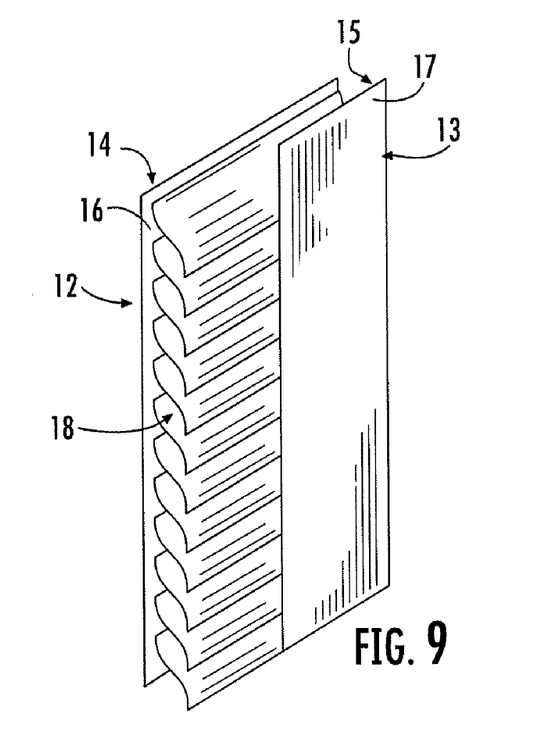
FIG. 9 is a cut-away perspective view of a schematic diagram of yet another armor panel according to one embodiment of the present invention.
Figure 10:
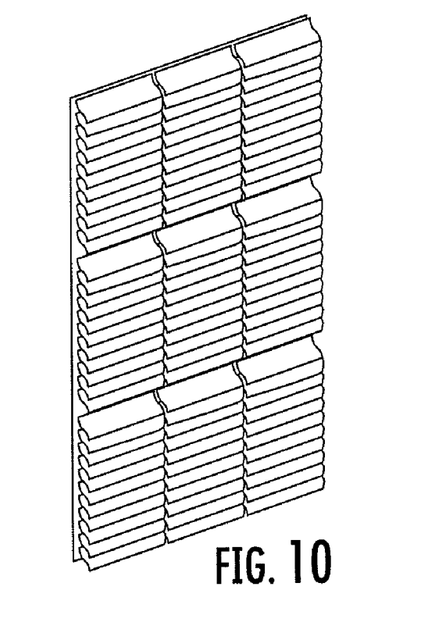
FIG. 10 is a cut-away perspective view of a schematic diagram of an arrangement of armor panels according to one embodiment of the present invention.
Figure 11:
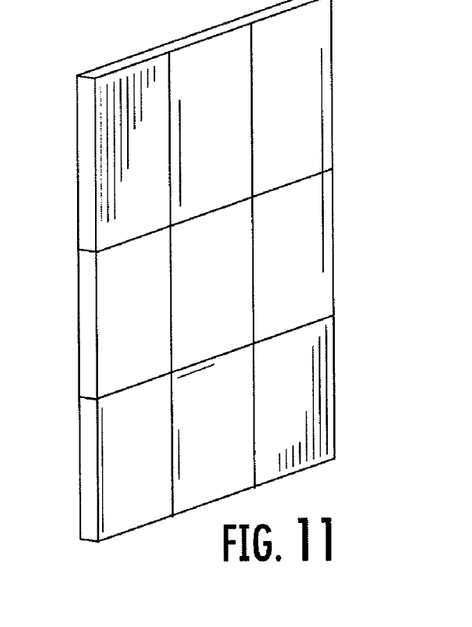
FIG. 11 is a perspective view of a schematic diagram of an arrangement of armor panels according to one embodiment of the present invention.

Particularly as used in an armor system in accordance with an embodiment of the present invention, such as shown in FIG. 9, energy absorbing elements 18 may be disposed behind an outer sheet 13 that defines an interior surface 15 directed toward the inner surface 16 of the inner sheet 12 and an opposing exterior surface 17. An outer sheet 13 is not required for an embodiment of the present invention such as shown in FIG. 10, but is preferable for such exemplary advantages as hiding the armor system, protecting damage to the armor system from events which do not involve high energy impacts, ease of handling, installation, and maintenance of the armor system and the body being protected by the armor system, improved fluid flow from a smooth exterior surface of an outer sheet, and aesthetics of the armor system and the body being protected by the armor system. Armor panels as shown in FIG. 9 may be combined into an armor system formed of a plurality of armor panels as shown in FIG. 11 with an outer sheet, or as shown without an outer sheet in FIG. 10.

Figure 12:
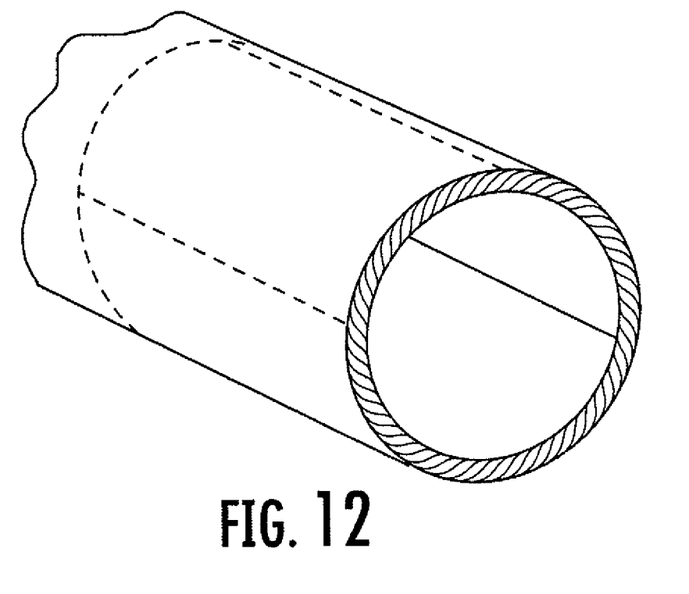
FIG. 12 is a perspective cross-section view of a portion of an armor system according to one embodiment of the present invention.
Figure 13:
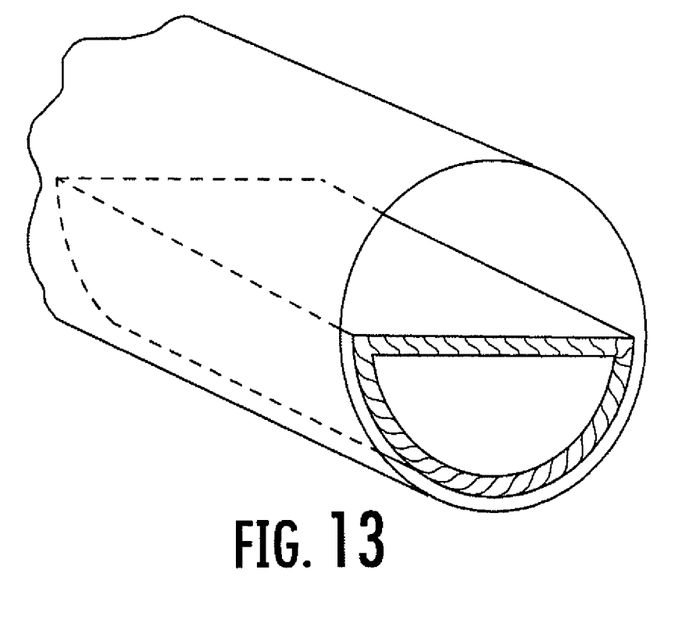
FIG. 13 is a perspective cross-section view of a portion of another armor system according to one embodiment of the present invention.
Figure 14:
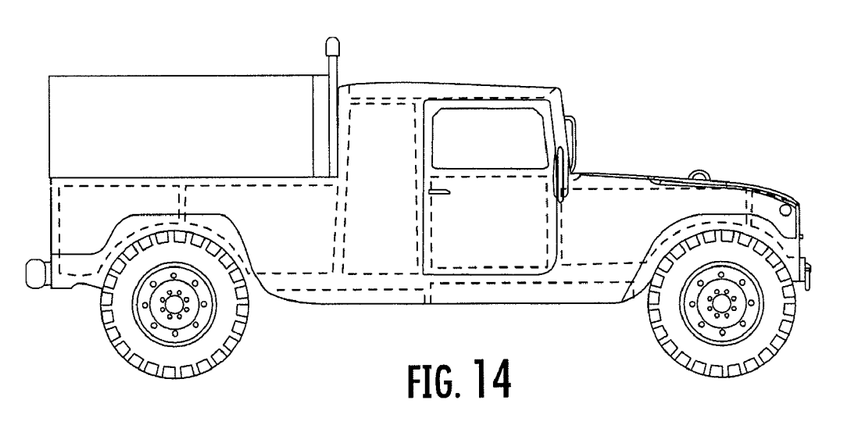
FIG. 14 is a schematic diagram of yet another armor system according to one embodiment of the present invention.

Embodiments of armor systems in accordance with an embodiment of the present invention may be used for a variety of purposes and in a variety of different manners. For example, FIG. 12 is a perspective cross-section view of a portion of an armor system according to one embodiment of the present invention which is configured to be used, for example, around a cylindrical portion of a body of an aircraft. A similar configuration may be used, for example, around a cylindrical portion of an individual support member, such as around a vehicle frame rail. FIG. 13 is a perspective cross-section view of a portion of another armor system according to one embodiment of the present invention which is configured to be used, for example, to protect an aircraft from high energy events, such as explosions, which may occur in a luggage compartment or other sub-compartment of an aircraft. FIG. 14 shows a schematic diagram according to one embodiment of the present invention in which dashed lines may represent surfaces of a vehicle which are protected by an armor system in accordance with an embodiment of the present invention, such as where armor panels in accordance with an embodiment of the present invention are attached on the outside of the vehicle, or where the exterior surface of the vehicle is the outer sheet of an armor panel and energy absorption elements are located behind the exterior surface of the vehicle. Such an embodiment may be advantageous to protect the vehicle and troops within the vehicle from high energy events such as landmines, IEDs, and like explosions. Embodiments of the present invention may be designed to protect the exterior body of such vehicle resources as an aircraft, such surrounding the fuselage, wings, nose, and tail sections of an aircraft, or the exterior body of a ship, such as to protect the ship hull from effects of ordnance and like high energy events. For example, S-shaped absorption elements may be positioned between inner and outer walls of a ship to improve the survivability and health of a ship in the event of a bomb, like ordnance, or other high energy event.

Figure 15:
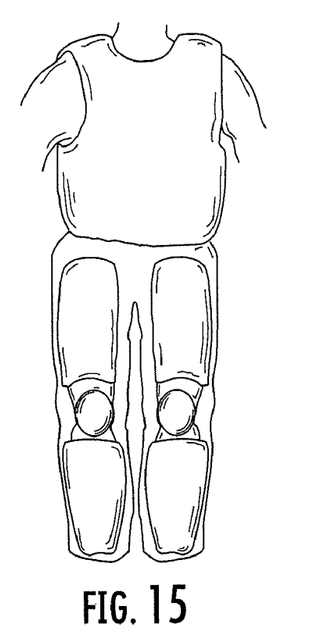
FIG. 15 is a schematic diagram of personnel body armor according to one embodiment of the present invention.
Figure 16:
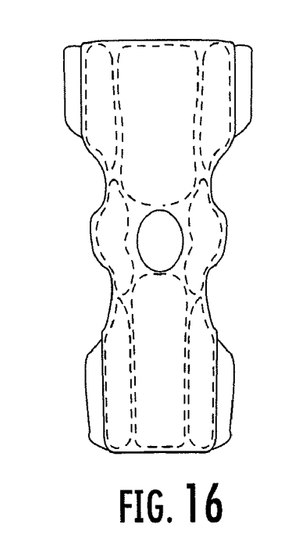
FIG. 16 is another schematic diagram of personnel body armor according to one embodiment of the present invention.

Similarly, embodiments of the present invention may be designed to be used as personnel body armor. FIG. 15 is a plan view of a schematic diagram of personnel body armor according to one embodiment of the present invention. FIG. 16 is a top plan view of a schematic diagram of personnel body armor according to one embodiment of the present invention. Because of the lightweight properties of laminate composite materials, personnel body armor may be constructed with armor panels in accordance with an embodiment of the present invention, such as where multiple armor panels are used to create flexible, wearable protection over areas of the body. For example, an upper-body vest armor system may be constructed from two armor panels conforming to the front and back of the body which are curved to wrap around the sides of the body. Alternatively, to provide a more flexible upper-body vest armor system, multiple panels may be used throughout the armor system, such as shown by the numerous dashed line segments shown in FIG. 16. Embodiments of personnel body armor designed in accordance with an embodiment of the present invention may advantageously include venting or like holes in the inner and outer sheets for allowing the personnel body armor to breathe, such as where holes are dispersed over the sheets between adjacent energy absorbing elements.

Embodiments of armor according to the present invention, and lightweight armor, in particular, may play an important role in the protection and survivability of personnel, vehicular resources, equipment resources, and other resources which require protection from high energy debris and pressure, particularly those resources for which it may not be feasible to support heavier, thicker forms of armor.

Embodiments of protective devices, such as armor panels and body armor systems, for use in containing high energy debris and pressure are provided which employ a plurality of energy absorption elements disposed on an outer surface of a rigid inner sheet, where the outer surface faces away from the body being protected from the high energy event, such as an explosion. Each energy absorption element extends generally away from the body to permit the high energy event to first impact upon the energy absorption elements, rather than the body. Energy absorption elements are formed of laminate composite materials. As such, energy absorption elements are configured to contain high energy debris material and pressure impacting the energy absorption element through delamination of the composite material.

Figure 17:
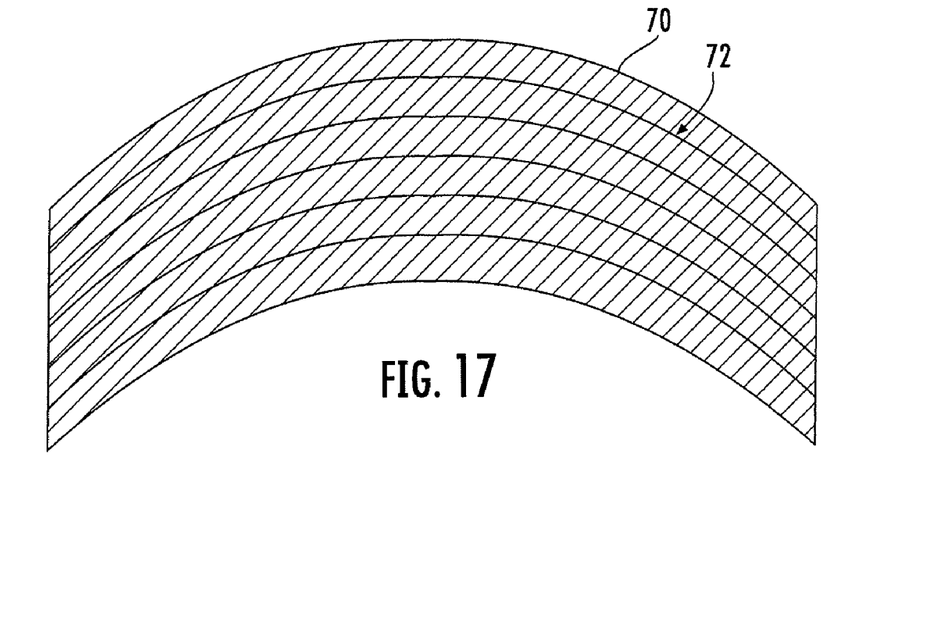
FIG. 17 is an example depiction of a section of a contoured laminate composite material for use in accordance with an embodiment of the present invention.
Figure 18:
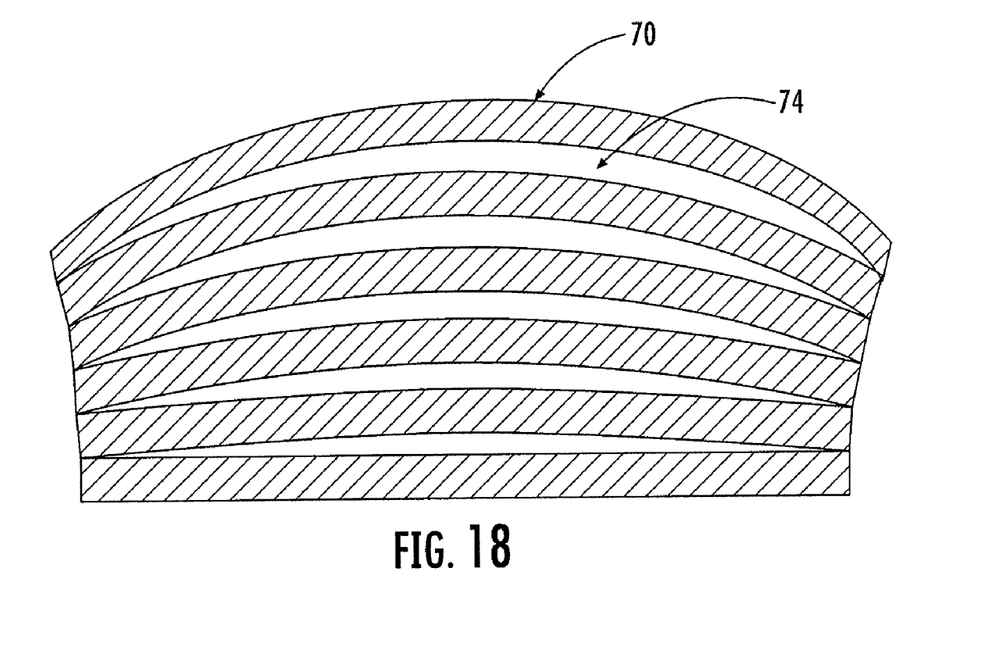
FIG. 18 is an example depiction of the section of contoured laminate composite material of FIG. 17 after delamination in accordance with an embodiment of the present invention.

FIGS. 17 and 18 are provided to show an example depiction of a section of a contoured laminate composite material for use in accordance with an embodiment of the present invention. FIG. 17 shows a cross-section of the contoured laminate composite material as it may appear in an embodiment of the present invention before impact of a high energy event. Individual plies 70 of the material are adhered together at intersections 72 between the individual plies 70. FIG. 18 shows how the section of contoured laminate composite material may delaminate as a result of an impact of a high energy event, such as where an ordnance or pressure has exerted a load to flatten the contoured laminate composite material. Individual plies 70 may have separated, i.e., delaminated or broken the adhesion, from adjacent individual plies 70 thereby creating a gap of air 74 between layers of the composite material.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A composite armor panel configured to absorb energy to protect a body from the impact of a high energy event, the panel comprising:
    an inner sheet defining opposite inner and outer surfaces, the inner surface directed toward the body; and
    a plurality of energy absorption elements disposed on the outer surface of the inner sheet, each energy absorption element connected at a terminating end to the inner sheet, formed of a laminate composite material, and configured with: (a) a base extending from the terminating end generally outward from the inner sheet and (b) a cap extending in a generally transverse direction from the base, wherein each energy absorption element is configured to be deformed inwardly by the impact and thereby at least partially delaminate the laminate composite material of the energy absorbing element, wherein the cap is connected to a distal end of the base opposite the terminating end of the energy absorption element and defining an angle therebetween, and wherein the cap extends between a first end and a second end and the distal end of the base is connected to the cap between the first and second ends of the cap.

2. A composite armor panel according to claim 1, wherein the base and the cap of each energy absorbing element comprise flat composite materials.

3. A composite armor panel according to claim 1, wherein the angle is between −45 and 45 degrees.

4. A composite armor panel according to claim 1, wherein the base extends from the terminal end at an angle to the inner sheet of between 30 and 150 degrees.

5. A composite armor panel according to claim 1, wherein the distal end of the base is connected to the cap at a midpoint of the cap equidistant from the first and second ends of the cap.

6. A composite armor panel according to claim 1, wherein the cap of each energy absorbing element comprises a curved composite material.

7. A composite armor panel according to claim 6, wherein the base of each energy absorbing element comprises a flat composite material, the cap comprises an S-shape curved composite material, and the base and cap form a flat-and-curved combination having a λ-shaped (lambda-shaped) configuration.

8. A composite armor panel according to claim 1, wherein the cap of each energy absorbing element is configured to break free from the base by the impact.

9. A composite armor panel according to claim 1, wherein the base and the cap of each energy absorbing element are formed of different composite materials.

10. A composite armor panel according to claim 1, wherein the base and the cap of each energy absorbing element have different thicknesses.

11. A composite armor panel according to claim 1, wherein the base and cap of each of the energy absorption element are unitary.

12. A composite armor panel according to claim 1, wherein the base of each energy absorbing element and the inner sheet comprise a unitary composite member.

13. A composite armor panel according to claim 1, wherein at least a plurality of the energy absorption elements at least partially overlap an adjacent one of the energy absorption elements.

14. A composite armor panel according to claim 1, wherein the energy absorption elements extend generally in parallel and equidistant outward from the inner sheet and being spaced equidistant along the inner sheet.

15. A composite armor panel according to claim 1, wherein the laminate composite material of at least one of the base and cap of the energy absorption element includes a reinforcement material disposed in a matrix material.

16. A composite armor panel according to claim 1, wherein at least one energy absorption element is further configured for fiber breakage by the impact.

17. A composite armor panel according to claim 1, wherein the panel is personnel body armor, the inner sheet being configured to correspond to the shape of a portion of a human body.

18. A composite armor panel according to claim 1, wherein the panel is vehicle body armor, the inner sheet being configured to correspond to the shape of a portion of a vehicle.

19. A composite armor panel according to claim 18, the panel defines a portion of an interior compartment configured to protect the vehicle from the impact of a high energy event occurring in the interior compartment.

20. A composite armor panel according to claim 1 further comprising an outer sheet defining opposite interior and exterior surfaces, the interior surface directed toward the body, the inner sheet, and the plurality of energy absorption elements.

21. A method of protecting a body from the impact of a high energy event, comprising:

providing an inner sheet defining opposite inner and outer surfaces, the inner surface directed toward the body; and providing a plurality of energy absorption elements disposed on the outer surface of the inner sheet, each energy absorption element connected at a terminating end to the inner sheet, formed of a laminate composite material, and configured with: (a) a base extending from the terminating end generally outward from the inner sheet and (b) a cap extending in a generally transverse direction from the base, wherein each energy absorption element is configured to be deformed inwardly by the impact and thereby at least partially delaminate the laminate composite material of the energy absorbing element, wherein the cap is connected to a distal end of the base opposite the terminating end of the energy absorption element and defining an angle therebetween, and wherein the cap extends between a first end and a second end and the distal end of the base is connected to the cap between the first and second ends of the cap.

22. A method according to claim 21, further comprising delaminating the composite material to absorb energy of the impact.

23. A method according to claim 21, further comprising breaking free the cap of at least one of the plurality of energy absorbing elements from the base of the energy absorbing element to absorb energy of the impact.

24. A method according to claim 23, further comprising separately delaminating the composite material of the base and delaminating the composite material of the cap to absorb energy of the impact.

25. A method according to claim 21, further comprising breaking fibers of the composite material to absorb energy of the impact.

26. A composite armor panel configured to absorb energy to protect a body from the impact of a high energy event, the panel comprising:

an inner sheet defining opposite inner and outer surfaces, the inner surface directed toward the body; and a plurality of energy absorption elements disposed on the outer surface of the inner sheet, each energy absorption element connected at a terminating end to the inner sheet, formed of a laminate composite material, and configured with: (a) a base extending from the terminating end generally outward from the inner sheet and (b) a cap extending in a generally transverse direction from the base, wherein each energy absorption element is configured to be deformed inwardly by the impact and thereby at least partially delaminate the laminate composite material of the energy absorbing element, wherein the cap is connected to a distal end of the base opposite the terminating end of the energy absorption element and defining an angle therebetween, and wherein the cap extends between a first end and a second end and the distal end of the base is connected to the cap at the first end of the cap.

27. A composite armor panel according to claim 26, wherein the angle is between −45 and 45 degrees.

* * * * *